(12) United States Patent
Forrester

(10) Patent No.: US 6,688,811 B2
(45) Date of Patent: Feb. 10, 2004

(54) STABILIZATION METHOD FOR LEAD PROJECTILE IMPACT AREA

(76) Inventor: Keith E Forrester, 78 Tracy Way, Meredith, NH (US) 03253

(*) Notice: Subject to any disclaimer, the term of this patent is extended or adjusted under 35 U.S.C. 154(b) by 0 days.

(21) Appl. No.: 10/058,159

(22) Filed: Jan. 29, 2002

(65) Prior Publication Data

US 2003/0143031 A1 Jul. 31, 2003

(51) Int. Cl.$^7$ .............................. A62D 3/00; B09B 3/00
(52) U.S. Cl. ........................... 405/129.25; 405/129.45; 588/256; 588/236; 423/89
(58) Field of Search ................... 405/128.15, 128.45, 405/128.5, 128.7, 128.75; 588/256, 236; 423/89; 106/672

(56) References Cited

U.S. PATENT DOCUMENTS

| | | | |
|---|---|---|---|
| 4,328,750 A | | 5/1982 | Oberg et al. |
| 4,737,356 A | * | 4/1988 | O'Hara et al. ............... 588/256 |
| 5,162,600 A | * | 11/1992 | Cody et al. .................. 588/236 |
| 5,245,114 A | | 9/1993 | Forrester |
| 5,284,636 A | * | 2/1994 | Goff et al. ................... 423/235 |
| 5,430,233 A | | 7/1995 | Forrester |
| 5,512,702 A | * | 4/1996 | Ryan et al. .................. 588/256 |
| 5,536,899 A | | 7/1996 | Forrester |
| 5,569,155 A | * | 10/1996 | Pal et al. ..................... 588/256 |
| 5,674,176 A | * | 10/1997 | Pierce ......................... 588/256 |
| 5,722,928 A | | 3/1998 | Forrester |
| 5,846,178 A | * | 12/1998 | Forrester .................... 588/256 |
| 5,860,908 A | | 1/1999 | Forrester |
| 5,877,393 A | * | 3/1999 | Webster ...................... 588/236 |
| 5,931,773 A | * | 8/1999 | Pisani .......................... 588/256 |
| 6,050,929 A | | 4/2000 | Forrester |
| 6,186,939 B1 | | 2/2001 | Forrester |
| 6,204,430 B1 | * | 3/2001 | Baldwin et al. ............ 588/236 |
| 6,264,735 B1 | * | 7/2001 | Bean et al. .................. 106/672 |
| 6,290,637 B1 | * | 9/2001 | Eighmy ....................... 588/256 |
| 6,309,337 B1 | * | 10/2001 | Pal et al. ..................... 588/256 |

FOREIGN PATENT DOCUMENTS

| | | | | |
|---|---|---|---|---|
| JP | P 2000-93935 A | | 4/2000 | |
| JP | P 2000-189943 A | | 7/2000 | |
| WO | WO 98/24938 | | 6/1998 | |
| WO | WO 9942231 | * | 8/1999 | ............. B09B/3/00 |

OTHER PUBLICATIONS

US Dept of Energy "Stabilization Using Phosphate Bonded Ceramics" Innovative Technology Summary Report DOE/EM–0486, Sep. 1999, 26 pages total.*

"Indoor Army National Guard Firing Range, Stabilization of Lead Contaminated", "The EcoBond™ Process", "MT2 Project Highlights", "Cherry Creek Firing Range Environmental Maintenance", and "Reduced Bioavailability of Eco-Bond–Treated Waste", all (C) 2000, the above papers were downloaded from www.metalstt.com on Dec. 24, 2002.*

Fernald Environmental, "Lead Stabilization", Jul. 1999, from www.fenald.gov/VImages?Phototour/1999/July1999/Lead.htm, 2 pages.*

Brunner et al. "Lead Stabilization in Soils at the Hawthorne Army Depot, Nevada" 7 pages, presented Apr. 2001 per private correspondence with Examiner Mitchell and James Barthel.*

National Shooting Sports Foundation, "Environmental Aspects of Construction and Management of Outdoor Shooting Ranges", pp. 1–45 especially section 3.1.2 Lead/Management Techniques.*

Huntsman et al., "Development of a New Bullet Trap Design Using Shock–Absorbing Concrete (SACON)", Terran Corp, presented Jun. 18–20, 2001, 9 pages.*

* cited by examiner

*Primary Examiner*—J. J. Swann
*Assistant Examiner*—Katherine Mitchell
(74) *Attorney, Agent, or Firm*—Hamilton, Brook, Smith & Reynolds, P.C.

(57) ABSTRACT

A method for reducing the leaching of lead from a lead projectile impact area acting to collect or stop such projectiles includes contacting the lead projectile impact area with a seed of dry granular lead stabilizing agents. This seeding or coating of lead stabilizing agents stabilizes lead in the bullet/shot impact area while also allowing for future lead bullets, fragments or lead shot fired into the soil to be stabilized upon contact with the lead stabilizing agent seeds or contact with rainwater leaching through the lead stabilizing agent seeds produced from the projectile coating, or excess seed from the lead shell projectiles. This method eliminates the need to remove or re-treat range soils and greatly reduces the environmental and health risks associated with the use of lead as projectiles in the open environment as well as at control trap ranges.

9 Claims, No Drawings

STABILIZATION METHOD FOR LEAD PROJECTILE IMPACT AREA

BACKGROUND OF INVENTION

The leaching of lead into the environment has been a major concern of health officials and water supply professionals for many years. In addition to concern over direct leaching of lead into ground waters and surface waters, regulators and professionals have also been concerned with indirect leaching of lead from unlined landfills which generate acidic leaching conditions due to decay of organic matter and thus high levels of lead leaching potential. In response to the concern of lead leaching from both water and landfill leachate borne conditions, the USEPA under direction from Congress, prepared regulations for testing, managing, and disposing of lead bearing wastes. The regulations under the Resource Conservation and Recovery Act (RCRA) and Comprehensive Environmental Response, Compensation, and Liability Act (CERCLA—a.k.a. Superfund) are extensive, complex, and have great impact on industry and practices involving heavy metals including lead. Under RCRA, lead bearing wastes may be considered hazardous if failing the Toxicity Characteristic Leaching Procedure (TCLP) at 5.0 ppm, and thus required to be disposed of at a hazardous waste landfill or treatment, storage and disposal facility (TSDF). These options are very expensive, normally $200.00 per waste ton. Under CERCLA, regulators can control or require treatment of lead wastes at almost any level as the states have flexibility in setting cleanup standards. Consequently, producing Pb bearing waste can be very expensive. Similar regulatory and remedial cost conditions exist in Japan, Switzerland, and other countries. To date, range soils have been subject only to CERCLA action which requires stabilization or disposal of the soils at closed range sites. The soil commonly fails TCLP criteria of 5.0 ppm and is thus a characteristic hazardous waste. The current methods used to manage these lead contaminated soils are reactive, i.e., they treat the lead after the soil becomes contaminated and, consequently, after the hazard exists. The chemicals used to treat lead bearing soils include phosphates, silicates, cements, and sulfides. The methods are, however, reactive in design except for U.S. Pat. No. 5,722,928 issued to Forrester which provides a method for stabilizing leachable lead by adding phosphate and complexing agent to the lead bearing material or waste prior to generating waste. Existing stabilization technology for shooting ranges teach methods of stabilization regardless of the range usage and thus apply readily soluble chemicals in all areas subject to lead exposure.

SUMMARY OF THE INVENTION

This invention relates to the stabilization of lead projectiles used in shotguns, handguns, rifles, and other projectile methods during impact of the projectile onto the collection soils, such that un-stabilized lead is not exposed to the open environment and/or range soil. The stabilization method involves applying impact-released phosphates, magnesium oxides, activated carbon, phosphates with complexing agents such as calcium, iron, chloride and aluminum, precipitants and combinations thereof to the range soils such that these stabilization agents will cause lead to convert to less soluble lead minerals upon contact in the range berm or soils which capture lead projectiles. The method reduces the leaching of lead from the surface of rifle, handgun and shotgun bullets and other lead projectiles. The method also includes contacting the lead projectiles with at least one stabilizing agent such that lead projectiles have reduced Pb leaching potential prior to exposure to the environment or projectile collecting traps. Optimally, the lead projectile is contacted with at least one stabilizing agent during entry into the soil mixed with the stabilizing agent. Lead projectiles stabilized by the methods described herein comprise a lead stabilizing agent incorporated during impact upon the surface of the projectile in an amount effective in reducing leaching of lead from the projectile, such as under natural or induced leaching conditions (e.g., TCLP, Japanese leaching test, California Waste Extraction Test).

This invention has the advantage of reducing the leachability of lead immediately upon first generation as a contaminant in the soil or material berm as well as into the environment with use of open area projectile use. This allows the soil berm and other lead projectile soils/materials to remain below TCLP levels and thus exempt from RCRA hazardous waste regulation. This immediate in-situ stabilization also assures control of Pb leaching and reduction of ecological and human exposure risks by creation of immediate upon-contact water insoluble lead compounds such as pyromorphite, lead phosphates, and stable compounds with silicates, hydroxides, hydroxyapatite Pb minerals, all of which have significantly less mobility and toxicity than the projectile lead form as elemental or lead oxides. The invention provides a means to control Pb solubility both under TCLP testing for hazardous waste classification as well as Pb bioavailability in the open environment.

The impact released lead stabilizing agent addition to the berm or range soils does not modify the soil density, appearance, fugitivity, particle size distribution, compactability or workability, and thus provides assurance that the projectile capture berm and soils will remain effective.

DETAILED DESCRIPTION OF THE INVENTION

Stabilization is herein defined as reducing the leaching of lead from projectiles and projectile contact areas including open environment, beds, traps, berms, stops or barriers used in the management or control of lead projectiles at rifle, handgun, shotgun, or military ordinance ranges where such projectiles are used for target practice or competition. The reduction of leaching is determined by performing a suitable or regulatory required leaching test on the material or waste.

The lead, in the projectiles to be fired or already fired into the soil, can be in elemental form and/or cationic form. The most common form of lead is elemental in the form of projectile slugs or fine particles of slug left on soil surfaces. The soil subjected to projectile exposure can contain as high as 100,000 ppm compositional lead and 1500 ppm TCLP leachable lead. Leachable lead in lead projectile exposed soils is commonly from 50 to 500 ppm TCLP, 200 ppm California Soluble Threshold Limit Concentration (STLC) and between 0.5 and 5.0 ppm total soluble and 1.0 micron suspended colloidal lead by water column and water extraction tests.

Leach test conditions, as defined herein, include the conditions to which a material or soil is subjected during dilute acetic acid leaching (TCLP), buffered citric acid leaching (STLC), distilled water or carbonated water leaching (Japanese and Swiss and SW-924). Suitable acetic acid leach tests include the USEPA SW-846 Manual described Toxicity Characteristic Leaching Procedure (TCLP) and Extraction Procedure Toxicity Test (EP Tox) now used in Canada. Briefly, in a TCLP test, 100 grams of waste are tumbled with 2000 ml of dilute and buffered acetic acid for 18 hours. The extract solution is made up from 5.7 ml of glacial acetic acid and 64.3 ml of 1.0 normal sodium hydroxide up to 1000 ml dilution with reagent water.

Suitable water leach tests include the Japanese leach test which tumbles 50 grams of composited soil sample in 500 ml of water held at pH 5.8 to 6.3, followed by centrifuge and 0.45 micron filtration prior to analyses. Another suitable distilled water $CO_2$ saturated method is the Swiss protocol using 100 grams of cemented waste at 1 $cm^3$ in two (2) sequential water baths of 2000 ml. The concentration of heavy metals and salts are measured for each bath and averaged together before comparison to the Swiss criteria.

Suitable citric acid leach tests include the California Waste Extraction Test (WET), which is described in Title 22, Section 66700, "Environmental Health" of the California Health & Safety Code. Briefly, in a WET test, 50 grams of waste are tumbled in a 1000 ml tumbler with 500 grams of sodium citrate solution for a period of 48 hours. Leachable lead, contained in the waste, then complexes with citrate anions to form lead citrate. The concentration of leached lead is then analyzed by Inductively-Coupled Plasma (ICP) after filtration of a 100 ml aliquot from the tumbler through a 45 micron glass bead filter. A WET result of $\geq 5$ ppm lead will result in the range soil as hazardous in California.

According to the methods of the invention, leachable lead can be stabilized in a lead projectile impact area by incorporating at least one lead stabilizing agent within and/or upon the projectile impact area. The amount of stabilizing agent incorporated within and/or upon the projectile impact area will be that which is effective in reducing the leaching of lead from the projectile, for example to a level no more than 5.0 ppm lead, as determined in an EPA TCLP test performed on the projectile or material receiving the projectile as set forth in the Federal Register, Vol. 55, No. 126, pp. 26985–26998 (Jun. 29, 1990), or other leaching test. The lead stabilizing agent can be incorporated in the impact area by mixing, blending, tilling or surface application.

In one embodiment of the invention, the projectile impact area is contacted with a dry stabilizing agent, which is at least slightly water soluble, dilute acetic acid soluble and/or citric acid soluble. Preferably, the dry stabilizing agent is a granular phosphate that resists solubility in rain water under static conditions until such time the granular phosphate is impacted by the projectile at which time the granular phosphate is shattered into smaller fines which increases soluble surface area and thus increases dosage of phosphate to the lead exposed area. The option of various stabilizing agents provides the design engineer flexibility in stabilizing agent recipe selection, with a preferred choice responding to the site conditions as well as required leaching test criteria. The use of fertilizer phosphates such as monoammonia phosphate (MAP), diammonium phosphate (DAP), single superphosphate (SSP), triple superphosphate (TSP) and combinations thereof would, as an example, provide a certain amount of water soluble phosphate contact with projectiles immediately upon surface exposure and a higher level of soil contact and lead stabilization upon leaching from the soil and lead projectile matrix by rainwater. The MAP, DAP, SSP, and TSP size, dose rate, application, and phosphate stabilizer content, could be engineered for each type of projectile and type of rifle range use. When lead comes into contact with the stabilizing agent either by dry surface contact or through water contact after firing into range soils, it forms low water soluble compounds, typically a mineral phosphate or precipitate, which is less soluble than the lead originally in the soil or projectile, particularly under leach test conditions. For example, the mineral apatite lead phosphate $Ca_4(Pb)(PO_4)_3$ OH lead phosphate $Pb_3(PO_4)_2$, lead silicate $Pb_2(SlO_3)$ and lead sulfide PbS, can be formed by adding respective precipitating agent seeds to the projectile impact area.

In another method, the lead projectiles are contacted with at least one phosphate in the presence of a complexing agent selected to generate specific apatite minerals on the projectile. The complexing agent could include iron, alumina, calcium, chlorides, and various other agents which provide for formation of phosphate minerals such as chloropyromorphite and lead apatite. Use of phosphates in the presence of complex agents is taught by U.S. Pat. No. 5,722,928 issued to Forrester.

Examples of suitable lead precipitating and stabilizing agents include, but are not limited to, phosphate fertilizers (e.g., MAP, DAP, SSP, TSP), phosphate rock, pulverized phosphate rock, calcium orthophosphates, prilled phosphate fertilizers, dolomitic lime, lime, carbonates, magnesium oxides, silicates, sodium metasilicates, phosphates, and lead complexing agents and combinations of the above, phosphoric acids, green phosphoric acid, amber phosphoric acid, or black phosphoric acid, Coproduct solution, hypophosphoric acid, metaphosphoric acid, pyrophosphoric acid, bone phosphate and combinations thereof. Salts of phosphoric acid can be used and are preferably alkali metal salts such as, but not limited to, trisodium phosphate, dicalcium phosphate, disodium hydrogen phosphate, sodium dihydrogen phosphate, tripotassium phosphate, dipotassium hydrogen phosphate, potassium dihydrogen phosphate, trilithium phosphate, dilithium hydrogen phosphate, lithium dihydrogen phosphate or mixtures thereof.

The amounts of lead stabilizing agent used, according to the method of invention, depend on various factors including projectile character, required lead stabilizing agent, required stabilizing residual for the range soil, desired lead reduction potential, and site environmental control objectives. The amount of the lead stabilizing seed, coating or combinations thereof to be added to the projectile impact area to ensure adequate immobilization of lead will also depend on such variables as the alkalinity of the range soil and/or any other solid residue that may be present with a buffering capability, the amount of lead projectiles (i.e., lead bird shot versus single bullet) initially present, and so on. It has been found that an amount of certain stabilizing agents such as triple superphosphate, phosphoric acid, silicates, equivalent to between about 3% and about 5% by weight of projectile is sufficient for initial TCLP stabilization. However, the foregoing is not intended to preclude yet higher or lower usage of stabilizing agent seeds, liquid coating, or combinations if needed since it has been demonstrated that amounts greater than 5% by weight also work, but are more costly.

The examples below are merely illustrative of this invention and are not intended to limit it thereby in any way.

EXAMPLE 1

In this example, projectile impact soil was stabilized with varying amounts of stabilizing agents including granular triple superphosphate (GTSP), polymer coated TSP and polymer coated magnesium oxide. Equal amounts of 12 gauge bird shot and 357 handgun ammo lead projectiles were then fired into a receiving test pit of clean sand and stabilized sand. Both stabilized and un-stabilized soil were subsequently tested for TCLP leachable Pb. The samples of range soils were then extracted according to TCLP procedure set forth in Federal Register, Vol. 55, No. 126, pp. 26985–26998 (Jun. 29, 1990), which is hereby incorporated by reference and water extraction by substituting deionized water for the TCLP extraction fluid solution in the TCLP test. This test procedure is also referenced in 40 C.F.R. 260 (Appendix 2) and EPA SW 846, 3$^{rd}$ Edition. The retained leachate was digested prior to analysis by ICP.

TABLE 1

| Stabilizing Agent weight (%) | Soil Pb TCLP (ppm) | Soil Pb Water (ppm) |
|---|---|---|
| 0 | 623 | 54.0 |
| 2 TSP | 80.1 | ND |
| 5 TSP | ND | ND |
| 5 Poly TSP | 1.5 | ND |
| 5 poly MgO | 4.6 | ND |
| 3 TSP/3MgO | ND | ND |

EXAMPLE 2

In this example, two soil samples were stabilized with impact release GTSP and immediate release liquid green phosphoric acid (complexed fertilzer) and placed in plastic 6" diameter leaching columns. The objective of the study was to evaluate the effectiveness of GTSP verus green acid stabilized soils after 60 inches of rainwater column leaching. The soils were subjected to leaching and then subjected to lead projectile firing and exposure as with example 1.

TABLE 2

| Stabilizing Agent weight (%) | Soil Pb TCLP (ppm) | Soil Pb Water (ppm) |
|---|---|---|
| 5 GTSP (no leach) | ND | ND |
| 5 Acid (no leach) | ND | ND |
| 5 GTSP (leach) | ND | ND |
| 5 Acid (leach) | 230 | 12 |

The foregoing results in Table 1 and 2 readily established the operability of the present process to immobilize leachable, TCLP, and water soluble lead in the lead projectile impact area even after natural leaching effects thus allowing for production of a range soil which would retard lead leaching and avoid regulation as a hazardous waste due to TCLP leaching levels. Given the effectiveness of the triple superphosphate, phosphates and complexing agents in causing lead to stabilize as presented in the Table 1, it is believed that an amount of the stabilizing agents such as triple superphosphate, phosphate and complexing agents equivalent to less than 5% by weight of lead projectile impact area should be effective to immobilize lead from range projectiles. It is also apparent from the Table 1 results that certain stabilizing agents are more effective for leachate production control.

While this invention has been particularly shown and described with reference to preferred embodiments thereof, it will be understood by those skilled in the art that various changes in form and details may be made therein without departing from the spirit and scope of the invention as defined by the appended claims.

I claim:

1. A method of stabilizing lead in a lead projectile impact area and in a lead projectile, comprising incorporating at least one polymer coated dry granular lead stabilizing agent within and/or upon the surface of the projectile impact area in an amount effective in reducing the leaching of lead from a lead projectile to a level no more than 5.0 ppm lead as determined in an EPA TCLP test performed on the lead projectile, the projectile impact area soils or material receiving the lead projectile as set forth in the Federal Register, vol. 55, no. 126, pp. 26985–26998 (Jun. 29, 1990), wherein the polymer coating of the at least one dry granular lead stabilizing agent is shattered when impacted by a lead projectile, thereby releasing the lead stabilizing agent to stabilize lead in the lead projectile impact area and in the lead projectile.

2. The method of claim 1, wherein the lead stabilizing agent is selected from the group consisting of phosphates, phosphate and complexing agents, phosphate rock, calcium orthophosphate, superphosphates, triple superphosphates, phosphate fertilizers, phosphate rock, bone phosphate, monocalcium phosphate, monoammonia phosphate, diammonium phosphate, salts of phosphoric acid, and combinations thereof.

3. The method of claim 2, wherein the salts of phosphoric acid are alkali metal salts.

4. The method of claim 2, wherein the salts of phosphoric acid are selected from the group consisting of a trisodium phosphate, dicalcium phosphate, disodium hydrogen phosphate, sodium dihydrogen phosphate, tripotassium phosphate, dipotassium hydrogen phosphate, potassium dihydrogen phosphate, trilithium phosphate, dilithium hydrogen phosphate, lithium dihydrogen phosphate and mixtures thereof.

5. The method of claim 2, wherein the lead stabilizing agent is phosphate and a complexing agent which are supplied as one product and wherein the complexing agent is selected from the group consisting of iron, chloride, calcium, aluminum, and mixtures thereof.

6. The method of claim 1, wherein the lead stabilizing agent is selected from the group consisting of phosphate, phosphate fertilizer, triple superphosphate, phosphate and complexing agents, polymer, silicates, lime, magnesium oxides, and combinations thereof, wherein the lead stabilizing agent is present in an amount equivalent to 0.01% to about 15% by weight based on the total lead weight in the lead projectiles.

7. The method of claim 1, wherein the lead stabilizing agent is selected from the group consisting of phosphate, phosphate fertilizer, superphosphate, phosphate rock, phosphate and complexing agent, polymer, silicates, lime, magnesium oxides, and combinations thereof, wherein the lead stabilizing agent is present in an amount equivalent to about 1.0% to about 15% by weight based on the total lead weight in the lead projectiles.

8. The method of claim 1, wherein the incorporating is performed by mixing, blending, contacting, spraying, or other contacting means.

9. The method as in claim 1 wherein the dry lead stabilizing agent is incorporated within and upon the surface of the projectile impact area material or soil.

* * * * *